United States Patent [19]
Albert

[11] Patent Number: 4,592,717
[45] Date of Patent: Jun. 3, 1986

[54] END RETRACT DEVICE FOR COMPLETING SPHERICALLY SHAPED REFLECTIVE FILM

[75] Inventor: Donn E. Albert, Florissant, Mo.

[73] Assignee: McDonnell Douglas Corporation, St. Louis, Mo.

[21] Appl. No.: 606,921

[22] Filed: May 4, 1984

[51] Int. Cl.[4] .............................................. B29C 53/04
[52] U.S. Cl. .................................. 425/400; 425/405 R
[58] Field of Search ............... 264/292; 425/388, 393, 425/395, 400, 405 R, 412, 383

[56] References Cited

U.S. PATENT DOCUMENTS

| | | | |
|---|---|---|---|
| 2,142,445 | 1/1939 | Helwig | 264/291 |
| 2,817,117 | 12/1957 | Shields et al. | 264/291 |
| 2,968,064 | 1/1961 | Howell | 425/388 |
| 3,020,596 | 2/1962 | Clapp et al. | 425/325 |
| 3,041,668 | 7/1962 | Bonza et al. | 264/516 |
| 3,118,182 | 1/1964 | De Muth | 425/388 |
| 3,293,343 | 12/1968 | Mattimoe et al. | 264/291 |
| 3,814,562 | 6/1974 | Diamond | 425/388 |
| 4,115,177 | 9/1978 | Nelson | 156/245 |
| 4,139,586 | 2/1979 | Gasson | 425/388 |
| 4,173,397 | 11/1979 | Simpson | 350/438 |
| 4,268,332 | 5/1981 | Winders | 156/160 |
| 4,293,192 | 10/1981 | Bronstein | 350/296 |
| 4,372,027 | 2/1983 | Hutchison | 29/526 R |

Primary Examiner—Willard E. Hoag
Attorney, Agent, or Firm—Gravely, Lieder & Woodruff

[57] ABSTRACT

Apparatus for shaping the end portions of a reflective film to conform to a spherical shape comprising attaching the end portions of the film to flexible stretch blocks so the film wraps over a surface of the blocks which can be bent to arc positions matching the arc of curvature at the ends of the frame which carries the film in its final spherical configuration, and forcing the stretch blocks to flex about a neutral axis so the surface of the blocks which bend to match the arc of curvature at the ends of the frame move about fixed end points from a chord configuration to an arc configuration matching that of the ends of the frame thereby substantially uniformly stretching the film into its final spherical configuration.

8 Claims, 10 Drawing Figures

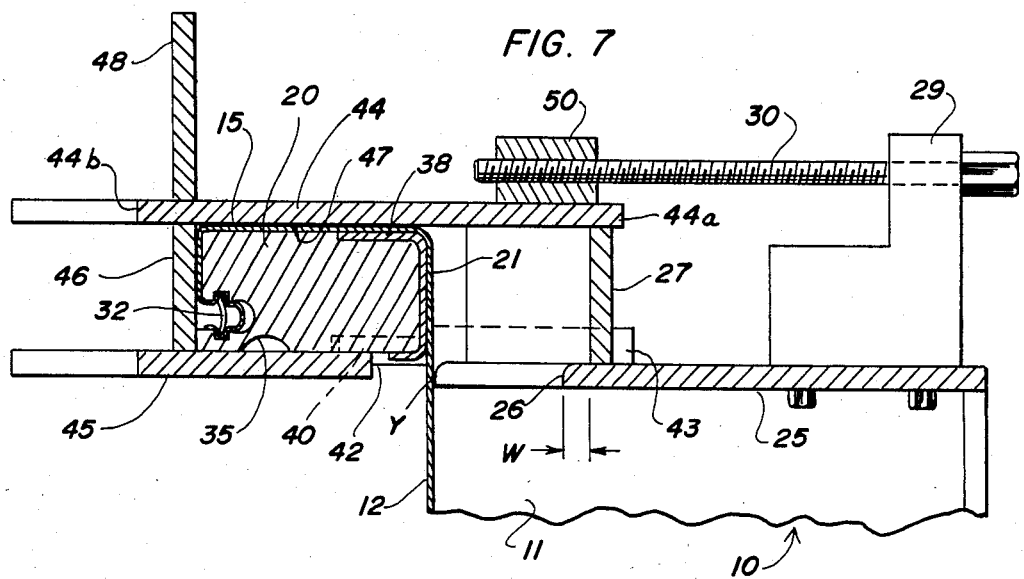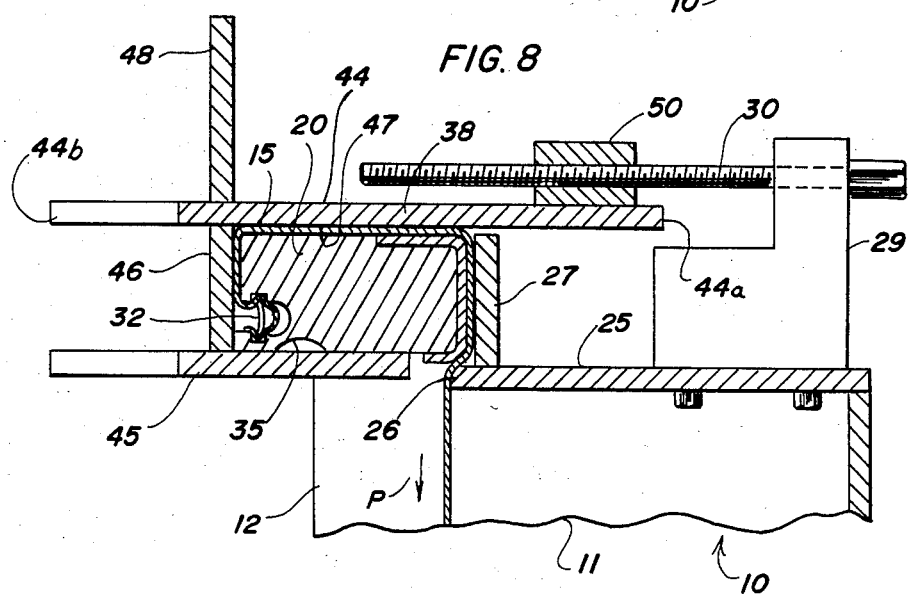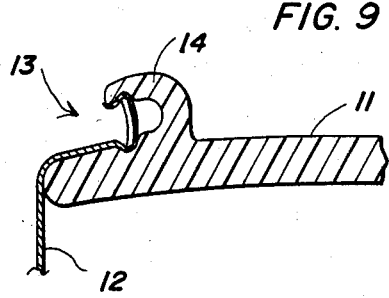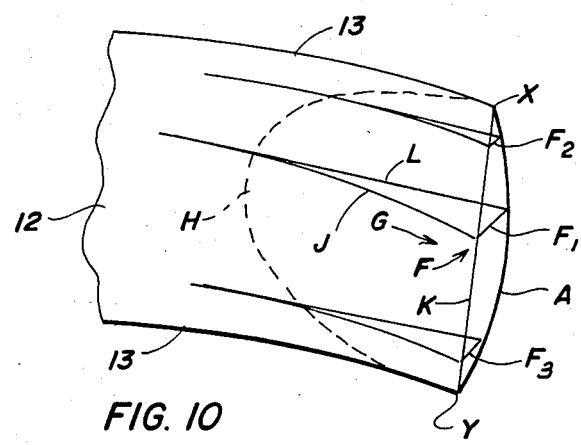

END RETRACT DEVICE FOR COMPLETING SPHERICALLY SHAPED REFLECTIVE FILM

BACKGROUND OF THE INVENTION

1. Field of the Invention

This invention is particularly concerned with the spherical shaping of a reflective film that is initially a frustum of a cone in flat pattern.

2. Description of the Prior Art

The art of shaping films of reflective character seems fairly well developed in relation to solar collectors. Examples of such film forming are found in U.S. Pat. Nos. Nelson 4,115,177 of Sept. 19, 1978; Simpson 4,173,397 of Nov. 6, 1979; Bronstein 4,293,192 of Oct. 6, 1981; Winders 4,268,332 of May 19, 1981; and Hutchison 4,372,027 of Feb. 8, 1983.

In the field of forming parts for automotive and aircraft usage, using films of appropriate composition, examples presently known include U.S. Pat. Nos. Clapp et al 3,020,596 of Feb. 13, 1962; Bonza et al 3,041,668 of July 3, 1962; DeMuth 3,118,182 of Jan. 21, 1964; Helwig 2,142,445 of Jan. 3, 1939; Mattimoe et al 3,293,343 of Dec. 20, 1966; and Shields et al 2,817,117 of Dec. 24, 1957.

The prior art examples are not particularly concerned with the forming of a thin film into a two-dimensional configuration for use as a mirror in pilot training simulators where the film is treated with a uniform coating of highly reflective material and then held in a spherical shape with its center at a known location for pilot viewing of that surface. The problem encountered in achieving the desired spherical shaping is associated with shaping the ends of the film so as to minimize distortion as much as possible.

SUMMARY OF THE INVENTION

The present spherical shaping of a thin film of reflective material involves supporting the film in two directions of curvature at the same time, and securing the film so there is a minimum of distortion over its effective reflective area. The prior art presently known does not disclose or suggest the shaping of a reflective film in two directions of curvature.

It has been discovered that employing a thin metalized film as a reflective surface, presents a problem in securing the film at the ends to accommodate both directions of curvature and reduce distortion to an insignificant extent. Accordingly, a principal object of the present invention is to provide a mechanism which will draw the end portions into position and overcome the resistance of the film to being curved in two directions at the same time. An equally important object of the invention resides in a method by which a flexible film can be shaped in two curved directions to result in obtaining a spherical configuration for the film.

It is a further important object of the present invention to provide means for curving and stretching the reflection film concurrently, such means being connected to the film along the chord of the circular shape and subsequently being drawn into an arc of the circular shape for stretching and forming the film to remove distortion as it assumes the reflective or mirror configuration.

A further object is to provide means for anchoring the reflective film in its final configuration and at the same time establishing a vacuum seal along its effective arc length so that on completing the anchoring of the film at its ends a seal is made to allow the mirror frame to be evacuated for establishing the final configuration of the thin film as a spherical mirror.

The features and characteristics of the means for shaping a thin film as a section of a sphere will be set forth in greater detail below.

BRIEF DESCRIPTION OF THE DRAWINGS

The present invention is shown in relation to a spherical mirror supported by a frame with particular interest directed to the end retract device for anchoring the thin film in its final position, and wherein:

FIG. 7 is a sectional view of the assembly of the stretching and forming means seen in FIG. 4, the view being taken across the center of the components seen in FIG. 4;

FIG. 8 is a sectional view similar to FIG. 7 but with the assembly moved to the position after the film has been stretched into its final position;

FIG. 9 is a fragmentary sectional view taken along line 9—9 in FIG. 1 illustrating the attachment means along the edges of the top and bottom walls of frame 10 for retaining the flexible film sealed against such edges; and FIG. 10 is a further diagrammatic sketch illustrating the reaction in the film 12 when it is forced to change its area in the end zone from one that is curved in only one direction to a spherical configuration having curvature in two directions.

DETAILED DESCRIPTION OF THE INVENTION

Figure 1:
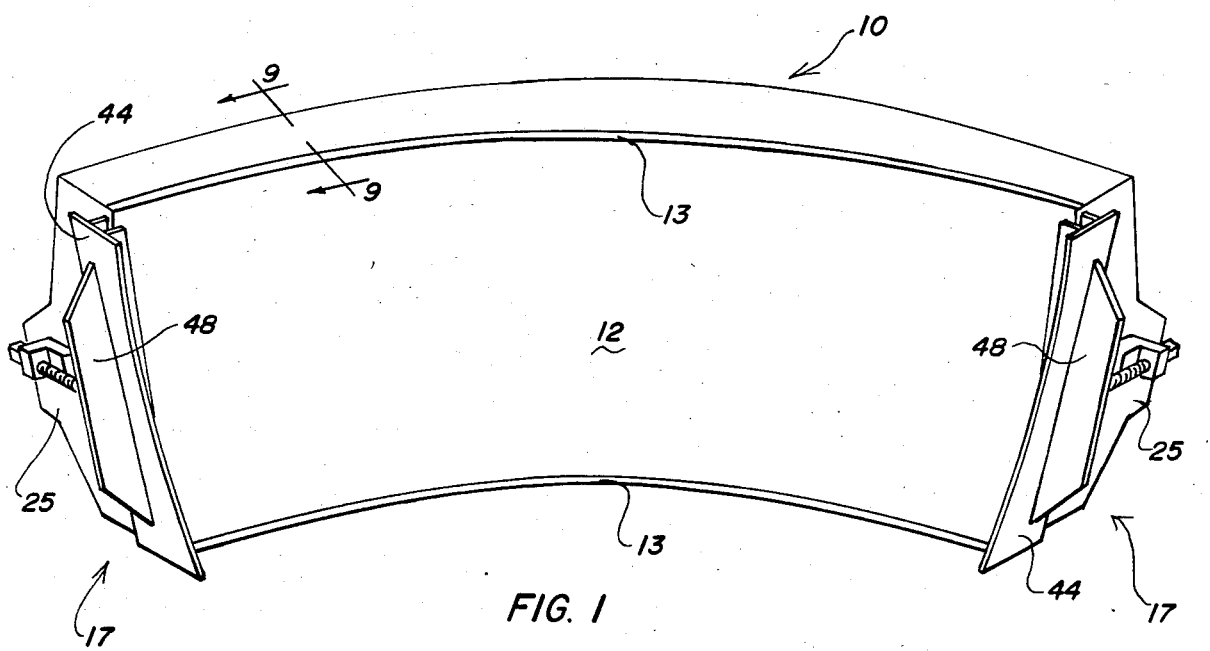
FIG. 1 is a perspective view looking into the reflective surface of the thin film as it would appear supported by a frame subject to being evacuated so the film is properly supported in a spherical configuration.
Figure 2:
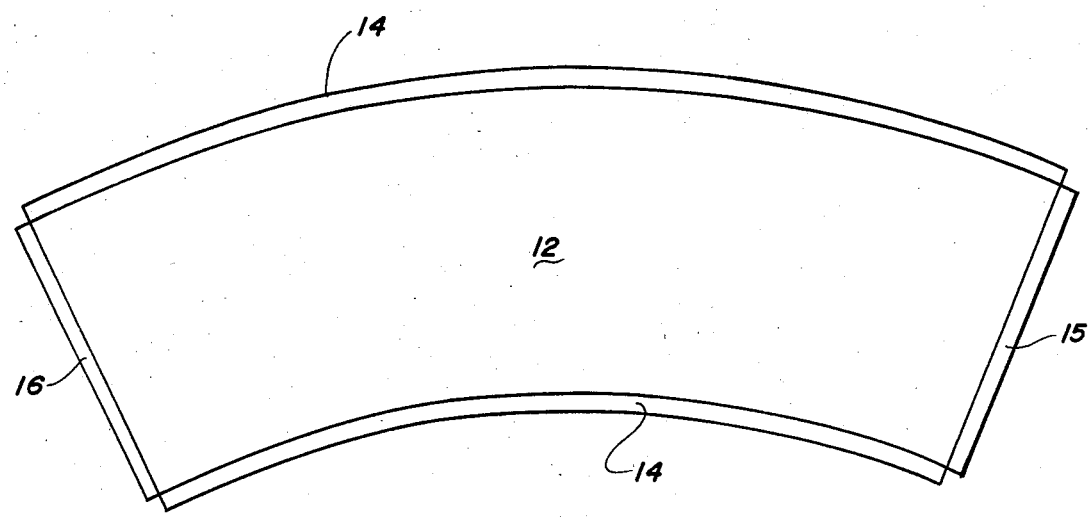
FIG. 2 is a plan view of the thin film which constitutes the reflective mirror seen in FIG. 1.

The present spherically shaped reflective film is part of an assembly shown in FIG. 1 wherein a suitable substantially rigid frame 10 is provided to support the thin film reflective means 12 in a spherically shaped configuration. The frame 10 has top and bottom walls 11 formed with curved front edges 13 having attachment means for securing the film 12. A typical attachment means is seen in FIG. 9. The margins 14 (FIG. 2) of the film 12 are intended to be sealed by the attachment means 13 on the frame walls 11. Margins 15 and 16 across the ends of the film are provided to form seals with means to be described presently. The formation of the respective seals at the margins allow the frame 10 to be evacuated by suitable means (not necessary to show) connected to a portion of the frame 10. It is noted that the plan view of the film 12 is shown in FIG. 2 prior to its being held in the frame 10 in a spherical configuration. The final spherical mirror or reflective form of the film 12 in the frame 10 may be usefully applied in projection systems of the type shown in Pund et al 4,427,274 of Jan. 24, 1984.

The subject of this disclosure is primarily directed to the features of the means 17 at the respective ends of the frame 10 for engaging, retracting and sealing the ends of the reflective surface 12 to the frame 10, whereby the seals can be made to allow evacuation of the frame interior as noted above. There are two end means 17 which are made in right and left hand configurations. That being understood, it is deemed sufficient to describe the right hand means 17 which will apply equally to the left hand means 17 except for reversal of shapes.

The shaping of a flat metallized ply of flexible reflective material into a spherical configuration for use as a reflective mirror having minimum marginal distortion is the aim of this invention. It has been found that certain treatment of the film at the opposite ends 17 is necessary in order to achieve spherocity in the end areas with minimum distortion. Generally, a substantial area of the film will react to being moved into a spherical configuration with little difficulty in obtaining a suitable vacuum seal. However, the ends of the film must move back on a radian as the film shape is converted from a chordal position to the desired spherically curved position. It has been discovered that to accomplish this formation of the film special tooling is needed due to the high loads created by the film.

Figure 3:
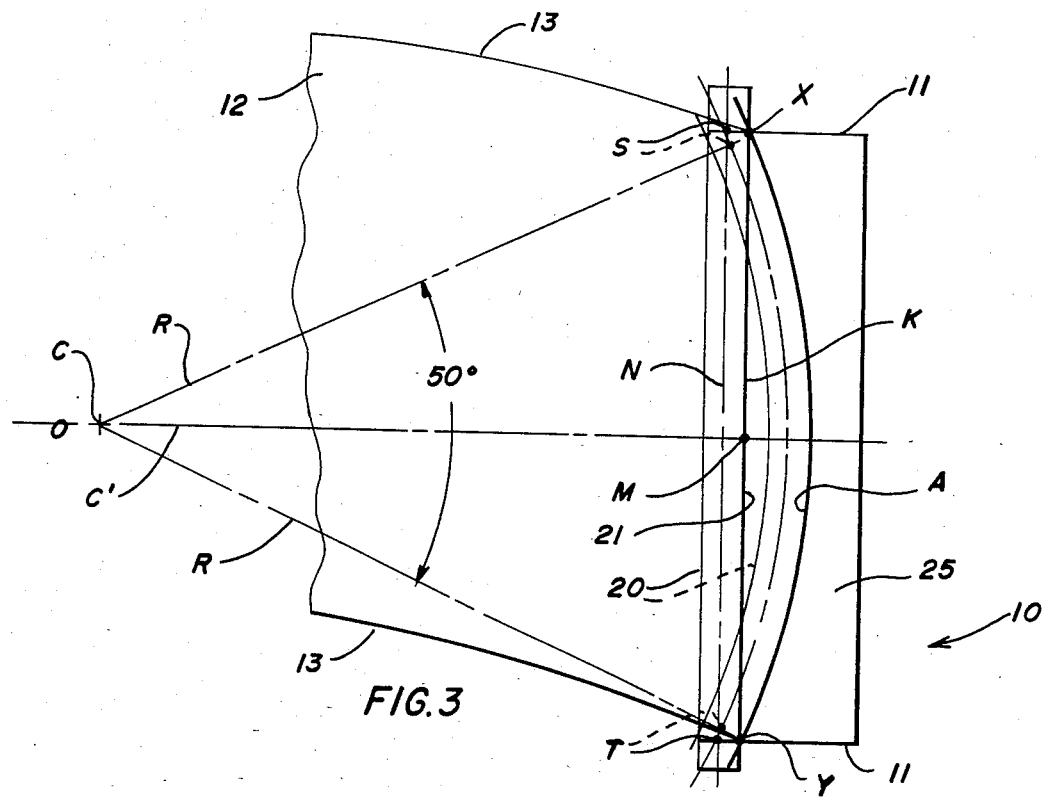
FIG. 3 is a diagrammatic sketch of the principles employed in calculating the physical characteristics of the film forming means at the ends of the mirror seen in FIG. 1.

Looking at FIG. 3 there is diagrammatically illustrated the principle involved in the design of the tooling to achieve the end formation for the film 12. The center of the spherical surface is shown at C so that a radial line R drawn from center C represents the radian of the reflective surface 12. The force needed to be exerted along any radian can have a value of up to several hundred pounds, while forces at ninety degrees to the radian, that is in the direction in the plane of surface 12, can have a magnitude of up to 15 pounds per linear inch of the chord length X-Y. These forces are encountered when working with thin metallized film having a thickness of the order of a thousandth of an inch. When the chord dimension of the spherical surface is of the order of 6 to 7 feet, for example, the force along a radian and at 90° to the radian rises to a value that only properly designed tooling is able to exert. The film employed in this reflective surface is Mylar that has been treated with a coating of aluminum. The film is stretched into its final shape by a force that stresses the Mylar slightly beyond its yield point. That is to say the Mylar stretch is carried to about 3.2% of its normal unstressed dimension. If it is stretched more than that the aluminum coating will be fractured, so the stretch consideration is a compromise between the different abilities of the film and its metallized component to undergo stretching.

An important consideration that calls for stretching the film to its final position is to avoid any looseness in the surface which would be expected to show up as distortion in the reflectivity of the mirror. A sufficient tightness throughout the film area is necessary for best results. That tightness result is obtained in the manner shown in FIG. 3 where the fixed points X and Y of the end of frame 11 are located on the arc A of the reflective surface of the film 12. In the example of FIG. 3 the center of the arc A is at point C and the included angle XCY is about 50°. When the film 12 is attached along margins 13 to the frame 11, the end will, before being secured to the frame, assume positions on a chord K of that arc A. It becomes necessary, then, to push the film into a position so it follows the arc distance A between points X and Y. A suitable pusher and stretcher member 20 is provided such that it will bend to follow the curvature of the arc A. Before the member 20 is bent, the film must be attached to it so as the film reaches its final form at the arc A a suitable seal will have been formed. By calculation the dimensions of the right triangle CXM, where M is the length to the midpoint of the arc A which is not known, and the angle XCY is known, the formula becomes:

chord XY = (sin ∠XCM X R) 2 = where the ∠XCM is 25° and R is the radian of the spherical surface and can be any value such as 6 feet for example.

Thus chord XY = (sin 25° × 6′)2 = 5.071′

Then solving for the length of the curved arc XY, the formula is $$XY = \frac{(2\pi \times 6)}{360°} \times \angle XCY$$

Thus the arc $XY = \frac{2\pi \times 6}{360°} \times 50° = 5.236'$

The member 20 possesses the characteristic that its surface 21 when relaxed spans the distance on a straight line between X and Y. Furthermore the member 20 must have its neutral axis N when undergoing bending spaced from surface 21 a distance such that after being bent the points X-Y of member 20 will still be aligned with points X-Y on the frame 10, thereby having the surface 21 of member 20 stretch so it becomes equal to the arc A. This relationship causes the surface 21 of the member to match the effective length of the arc A when member 20 has been pushed or drawn into its bent position. It can be appreciated from the geometry of the view of FIG. 3 that as the member 20 is moved to its broken line curved position the surface 21 thereof stretches while the end points S and T on the neutral axis N which correspond to points X and Y merely rotate to align on the radius R. The stretch, accordingly increases the relaxed dimensions 5.071 to a dimension of 5.236. The increase of the arc length X-Y over the chord length X-Y in dimension of 0.0165 stretches the thin film just beyond its yield point to the extent noted of about 3.2% of its relaxed or unstressed state. However, the length of the neutral axis does not change. Thus, the chord length between points S and T on the neutral axis remains equal to the arc length X and Y.

Figure 4:
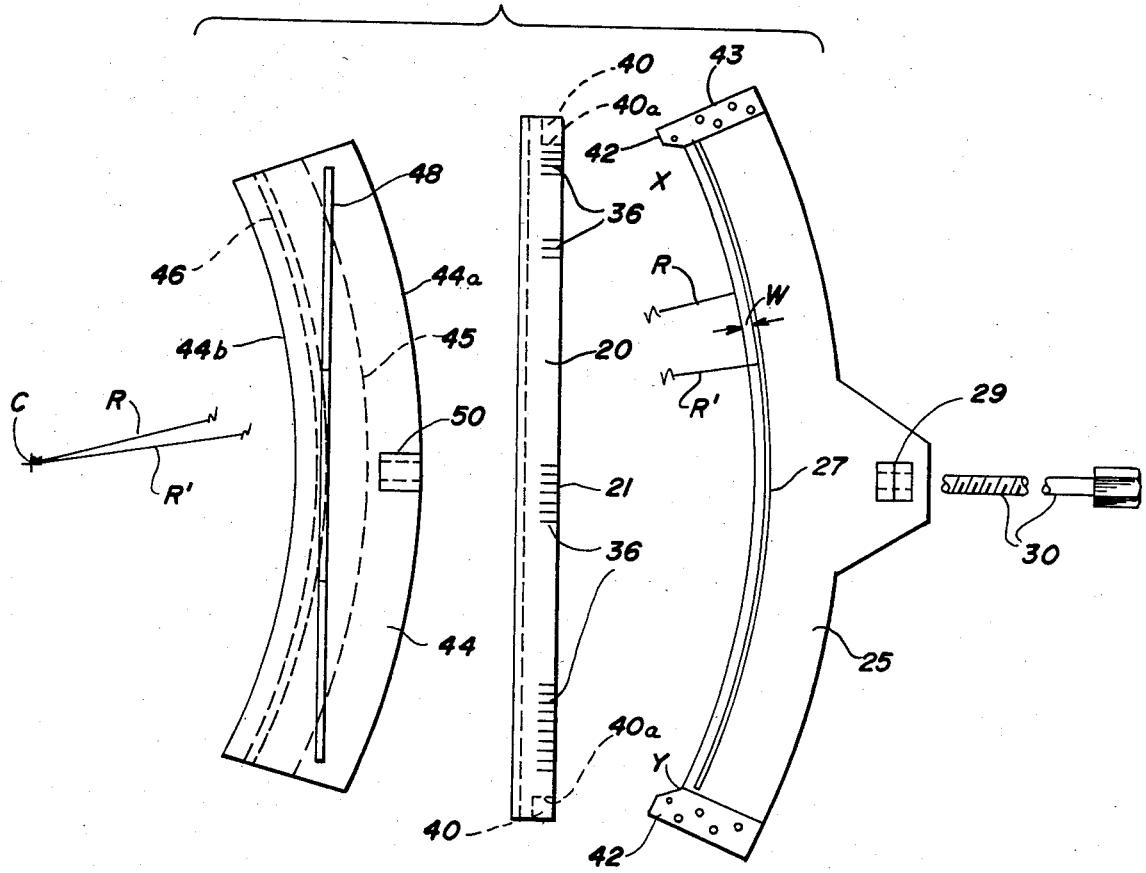
FIG. 4 is an exploded view showing the several components of the forming and stretching means applied to the thin film constituting the reflective surface seen in FIG. 1.
Figure 5:
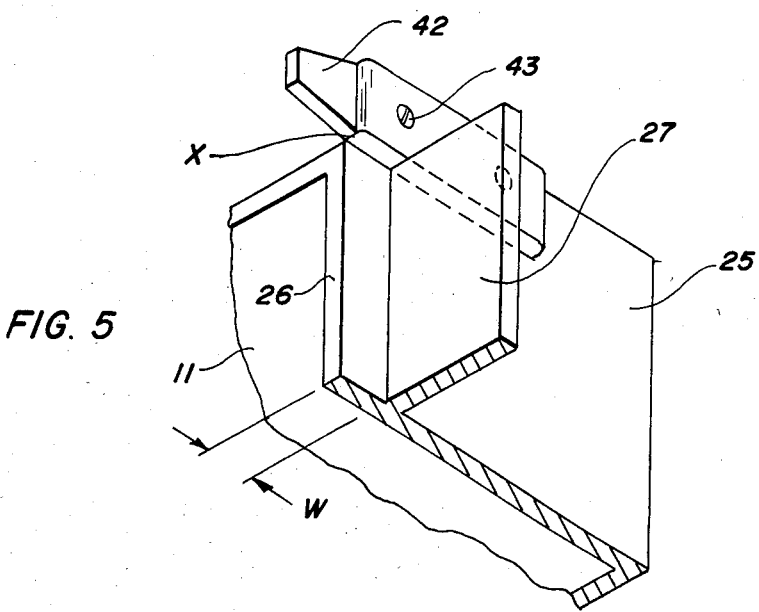
FIG. 5 is a fragmentary perspective view of the upper end of the frame showing details of the positioning means for the film stretching block and associated components.

Turning now to FIGS. 4 to 8, the tool for effecting the final position of the end area of the thin film 12 at the right hand end of FIG. 1 (the left hand end being the same but reversed) is made up of the end plate 25 for the frame 11 in which the curved edge 26 presents one surface struck from the center C of the curvature of the mirror. The plate 25 carries a rib 27 which forms a second surface curved along an arc from center C (see FIG. 4) that has a radius R′ different from the radius R by the width W which is the distance from the surface 26 to the face of the rib 27 as seen in FIG. 5. The differences in the radii R and R′ results in the plate 25 having an exposed lip or edge surface 26 in front of a surface provided by a rib 27 (see FIG. 7) for the purpose of furnishing a surface on the lip 26 against which the thin film 12 can be sealed. The end plate 25 carries a guide block 29 at about its midpoint to receive a draw bolt 30 which can push on the block 29 in a manner to be discussed.

Figure 6:
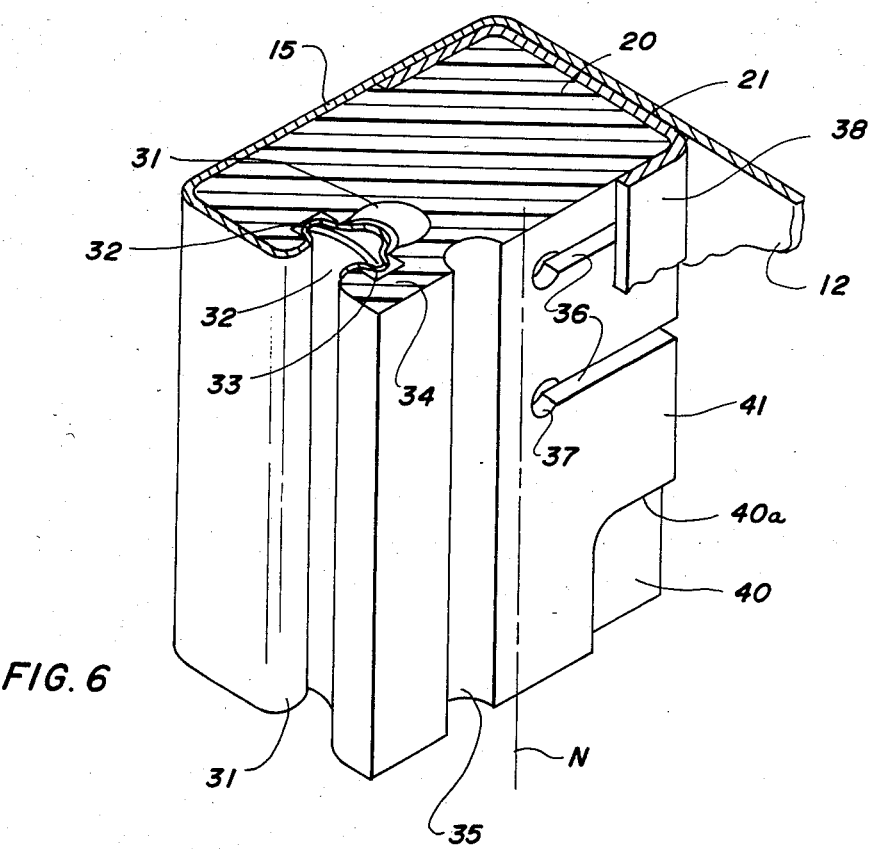
FIG. 6 is an enlarged perspective view of a portion of a film stretch block component.

Another component of the tooling is represented by member 20 which is the film stretching block 20. The function of the stretching or stretch block 20 is to secure an engagement with the margin 15 of the film 12. As depicted in FIG. 6, the margin 15 of the film 12 is directed about the body of the stretch block 20 from the edge 21 and is wrapped into the recess 31 where a securing key 32 can be pressed into the recess 31 so its edges press the film into lateral grooves 33. The key 32 fits snuggly into the grooves 33 and in the process of installing it the margin 34 of the block 20 is rendered sufficiently yieldable by a back notch 35 to allow the insertion of the key. The recess 31 runs throughout the length of the stretch block 20, as do the key grooves 33 and the notch 35. After the margin 15 of the film 12 has been secured by the key 32 in recess 31, the film is free in other portions lying against the block and across the edge 21 to adjust itself as the block is pushed or drawn into bent position, as depicted in FIG. 3.

The stretch block 20 is seen in greater detail in FIG. 6 where the edge 21 is interrupted by a number of slots 36 extending into terminal holes 37, the centers of which are located along a line spaced from the neutral axis N of the block 20. A suitable seal member 38 is secured over the slots 36 before the film 12 is wrapped over it to prevent the edges of the slots 38 puncturing the film 12. It is further noted in FIGS. 4, 6 and 7 that the stretch block 20 is formed at its respective ends with shallow recesses 40 formed in its surface 41 (FIG. 6) opposite to the surface covered by the wrapping of the film margin 15. These shallow recesses 40 are provided to receive abutment tangs 42 projecting from the ends of the plate 25 (FIG. 4). The tangs are formed on supports 43 fastened to the plate 25. The mating of the tangs 42 in recesses 40 serves to properly locate the stretch block on the plate 25 in preparation for moving the block from its straight alignment position to its bent curved position seen in FIG. 3 in broken outline.

In FIGS. 4, 7, and 8 the tooling is seen to include a film retract (or pusher) member 44 which is in the form of a plate having curved edges 44a and 44b carrying a similarly curved plate 45 spaced from one side of member 44 and held in spaced relation from the member 44 by a spacer 46. The spacer 46 and plate 45 make up a recess 47 in member 44 for the reception of the stretch block 20 such that the premounted film 12 extends outwardly away from the member 44. Since the film will exert a pull in a direction perpendicular to the plane of the member 44, a stiffening member or truss 48 is secured thereto to resist bending of the member 44. As shown in FIG. 4, the truss 48 is substantially straight so as to assume a position opposing the effort of the pull in the film 12 to bend the member 44. The member 44 carries an internally threaded block 50 to receive the bolt 30 (see FIG. 4).

Referring to FIG. 7, the stretch block 20, after the film 12 has been anchored as described in connection with FIG. 6, is mounted in the recess 47 of the member 44 and the two components 44 and 20 are aligned with the end plate 25 so the bolt 30 can be started into the block 50. A substantial part of the member 44 rides over the rib 27 on the end plate 25 so that the stretch block 20 will properly approach the curved surface of the rib 27 on the end plate 25. Continued threading of bolt 30 will draw the member 44 into the end plate 25 until the stretch block 20 assumes the final position seen in FIG. 8. The final position of the stretch block 20 will draw the film 12 over the edge 26 and establish a seal along that edge to resist entry of air when the frame 11 is evacuated to the extent required. It should now appear that the rib 27 assumes a curved shaped struck with radius R' from the center C (FIG. 4) giving it a longer radius than for the edge 26 on the end plate 25 by the set-back of rib 27 to the dimension W. The difference in the curvature of the edge 26 and rib 27 establishes the desired engagement of the film 12 over edge 26 in the final stretched position of the film 12.

After the margin 15 of the film 12 has been secured to the stretch block 20, as shown in FIG. 6 by the placement of the key 32, the stretch block 20 is positioned on the plate 25 so its end recesses 40 engage on the tangs 42 to obtain initial alignment of the film. This operation locates the film in its chordal position between points X and Y on plate 25 which are the same points shown on FIG. 4. The member 44 is then positioned so the block 50 lines up with block 29 to receive the draw bolt 30. As the bolt 30 is threaded into block 50, the member 44 begins to apply pressure on the stretch block 20 at its central zone which bends the block on its neutral axis N and initiates stretch along surface 21. That bending and stretching action continues until the stretch block 20 pushes the film against the curved rib 27 of the plate 25 (FIG. 8) so the film 12 is stretched from its chord dimension to its arc dimension from point X to point Y as is illustrated in FIG. 3. The result of the function of the parts 20 and 44 is that the film 12 is drawn in a direction to follow the motion of the stretch block 20 as it stretches from a chord dimension into an arc dimension, with a minimum of stretch at the ends X and Y where the margins 13 and 14 of the film have been secured to the frame.

It is important to limit the forces applied to the film near the end points X and Y so the film will not be ruptured by excessive applied load in the corners where margins 13 and 14 have been secured in fixed positions. The reaction of the film 12 to being forced into a spherical configuration is to exert a force on the member 44 tending to bend member 44 perpendicularly to its planar form. However, the stiffening truss or member 48 opposes this bending reaction. A much greater force is exerted by the film 12 in a direction substantially parallel to the surface of the film during its movement into the final position along the curved edge 26 on the plate 25. It can be visualized from the views of FIGS. 3, 7 and 8 that as the stretch block 20, while supported at its ends on tangs 42, is moved from the straight alignment by the member 44 into its curved arc alignment the film 12 will be formed to stretch in two directions. One direction is substantially parallel to the plane of the plate 25 and the second direction is parallel to the plane of the spherical surface which is perpendicular to the first direction. The second direction is indicated by the arrow P in FIG. 8.

The schematic view of FIG. 10 will demonstrate the principle involved in this invention. The curved line A is taken from FIG. 3 to show the curvature of the spherical surface from the end plate 25. The chord line K also is taken from the stretch block 20 in FIG. 3. The top and bottom curved lines 13 are taken from FIG. 1 which is the curvature of the spherical surface perpendicular to the curve of line A. The film 12 is positioned so its longitudinal margins 14 are attached along lines 13 at the top and bottom of the frame 10. The film 12 in the free end region must be moved so its chord line K matches the curved arc line A. This requires a force applied in the direction of arrow F along the radian of the spherical surface. In applying force in the direction F, another force in a direction in the plane of the film 12 is represented by the arrow G. The force F can be represented by the radial lines F1, F2 and F3 to illustrate the amount of movement which the film 12 must experience. The larger movement F1 is near the center of the curve A and forces above and below that central position diminish as at F2 and F3 until it is zero along the margins 13. The area of the film 12 that is affected by the forces F and G is represented by the broken line H. It has been demonstrated that the bell shaped area within the broken line H is produced by infinite horizontal sections, each one being depicted by a curved line J in the film being moved to the line L which is drawn from the end of line F1 on the arc A to its tangency to the curved line J. As the film 12 reaches its spherical configuration the bell shaped area disappears and a spherical surface substantially free of distortions appears in place of the bell shaped area. Substantial deviations from this method of spherically shaping the film 12 has resulted in rupturing the film.

The foregoing description has set forth structural characteristics of the method for transforming a flat pattern layout of a thin film of material having a reflective surface into a spherically shaped mirror. The method involves supporting longitudinally and spaced apart curved margins of the film in fixed curved positions having a common center which leaves the transversely directed end margins initially free and generally straight. The method then calls for providing end members with arcuate margins the center of which is the same as the common center for the longitudinal margins, and means for forcing the generally straight free ends into curved configurations matching the arcuate margins of the end members by simultaneously stretching the end margins and pulling the film in directions to cause the film to assume a spherical configuration so its reflective surface becomes a spherical mirror. This method is unique in that the end margins of the film which normally span the distance between the longitudinal margins are stretched from chord dimensions a sufficient amount to equal the arc of a curve the center of which arc is also the common center for the longitudinal margins.

The principle involved in the shaping of the film from the flat pattern of FIG. 2 to the spherical shape of FIG. 1 is illustrated in FIGS. 3 and 10. The means for accomplishing that change of shape is shown in FIGS. 4 to 8 inclusive. There the film edge 15 is first locked into the stretch block 20 (FIG. 6) and then the member 44 is engaged with the stretch block 20, and these two members are brought into alignment with the end plate 25 (FIG. 7) so the bolt 30 can be engaged in the block 50 to apply the needed force to draw the member 44 into its final position which causes the stretch block 20 to change its shape as explained above.

Having set forth the principles of the present invention in the foregoing disclosure it is understood that there may be variations in the mechanism for shaping the present reflective film.

What is claimed is:

1. In apparatus for forming a reflective surface of a flexible film into a spherically shaped mirror, the combination of:
   (a) a frame having longitudinally extending top and bottom walls and opposite end plates joining said top and bottom walls, said walls and end plates having margins presented in a common direction and collectively presenting edges that have a curvature the center of which is common to the collective edges, said curved edges on said end plates having a fixed arcuate length;
   (b) means extending along the curved edges of said top and bottom walls for engaging and retaining certain margins of the flexible film fixed against said curved edges; and
   (c) flexible film shaping and holding means cooperating with each of said curved edges on said end plates, each shaping and holding means comprising:
      1. a film shaping bracket movable relative to said end plate,
      2. a flexible film engaging block means carried by said shaping bracket in position to present the flexible film to said end plate, and
      3. positive operating means engaged between said shaping bracket and said end plate for moving said shaping bracket in a direction to force said flexible film engaging block means to conform the chord length of said flexible film to the fixed arcuate length of said end plate curved edge and impart a spherical configuration to the flexible film in the area of the reflective surface adjacent said end plate.

2. The combination set forth in claim 1 wherein said shaping bracket includes a recess having a curved shape substantially matching the arcuate length of said curved shape of said end plate edge, said film engageable block means being such as to hold the film in an initially substantially straight alignment, and said positive operating means being such as to move said shaping bracket relative to said end plate such that said film engaging block means stretches the flexible film into conforming to the arcuate length of said curved shape of said recess upon engaging said end plate edge.

3. The combination set forth in claim 1 wherein said end plate edge presents first and second surfaces, and said film engaging block means is movable to bring said flexible film into conforming with one of said end plate edge surfaces whereby the flexible film is retained in sealed engagement against said remaining edge surface.

4. The combination set forth in claim 1 wherein said flexible film shaping bracket includes stiffening means in position to resist bending thereof in a direction substantially perpendicular to the direction of movement by said positive operating means.

5. The combination set forth in claim 1 wherein said positive operating means such as to move said film shaping bracket in a linear path, and means carried by said end plate adjacent said top and bottom wall margins is positioned to engage said flexible film engaging block means adjacent the opposite ends thereof, whereby said film engaging block means is held in position for positive reaction to conform to the curvature of said end plate edge.

6. In apparatus for forming a flexible reflective film having a conic shape when in flat pattern layout into a spherical shaped reflective surface, the combination comprising:
   (a) a frame having spaced apart and longitudinally extending top and bottom walls and opposite end plates extending between said spaced top and bottom walls, said walls and end plates each having curved edges presented in a common direction and collectively defining the margins for supporting said flexible film in a spherical shaped configuration about a common center;
(b) attachment means for securing said flexible film to said top and bottom wall curved edges; and
(c) flexible film shaping and securing means cooperating with each of said end plates, each cooperating flexible film shaping and securing means including:
1. a normally straight but bendable block means having a length when straight substantially equal to the chord length for the curved edge of said end plate, said block means presenting a bendable leading edge over which said flexible film is presented, a trailing edge to which said flexible film is secured, and a neutral axis located between said leading and trailing edges, and
2. means for supporting and moving said block means from its normally straight position with said film attached thereto into bending to conform to the arc length of said end plate curved edge such that said leading edge stretches said flexible film from the chord length to the arc length of said end plate curved edge and secures said film at said end plate curved edge.

7. In apparatus for forming a reflective surface of a flexible film into a spherical mirror, the combination of:
(a) a frame having longitudinally extending and parallel top and bottom margins and opposite end margins have curved shapes which collectively are generated from a common center for defining the limits of the spherical mirror;
(b) means extending along said top and bottom margins for engaging and locking certain margins of said flexible film in position against said frame margins;
(c) flexible film shaping means for each transversely directed end margin of said frame, each shaping means comprising:
1. a film shaping bracket substantially co-extensive with and movable relative to said frame end margin, said bracket having a curved configuration matching said end margins,
2. a film stretching block mounted by said shaping bracket in position to engage the flexible film with said end margin,
3. means on said end margin engageable by said film stretching block for retaining said block in registry with said end margin, and
4. positive operating means engaged between said frame and said shaping bracket for moving said shaping bracket in a direction to force said stretching block to conform the flexible film to the curved shape of said end margin for effecting a bidirectional stretching of the film to conform it to said frame to anchor the flexible film in its final configuration.

8. In apparatus for forming a reflective surface of a flexible film into a spherically shaped mirror, the combination of:
(a) a frame consisting of top and bottom walls and end plates joining the ends of said top and bottom walls, said walls and plates having curved margins presented to face in the same direction with the curvature having a common center such that spherocity for the flexible film is determined;
(b) means on the margins of said top and bottom walls for sealing the margins of the flexible film thereto, the flexible film being curved in one direction corresponding with the curved margins of said top and bottom walls; and
(c) means associated with said end plates for bringing the flexible film into a curved position corresponding to the curved margins of said end plates, each of said associated means including,
1. a flexible film stretching member presenting a surface to which the flexible film is engaged, said member being in initial linear configuration with the film engaged, and being bendable about a neutral axis to a position to match the curvature of the end plate margin while stretching the flexible film;
2. bracket means having a curved margin substantially matching the curved margin of said end plate, said bracket means being adapted to engage said stretching member for forcing the latter member to bend out of its linear configuration for substantially matching the curved margin of said end plate;
3. abutment tongs on the extremities of the end plate curved margin in position to fix the position of said stretching member relative to the curved margin of the end plate in its linear configuration such that the flexible film engaged on said stretching member has an initial length substantially equal to the chord measurement of the curved margin on said end plate; and
4. means operable on said bracket means to move it into said end plate for stretching the flexible film from its initial linear configuration into a curved configuration substantially matching the curved measurement of said end plate margin.

* * * * *